March 13, 1962    A. A. BROSS    3,024,652
DEVICE TO MEASURE MAXIMUM ACCELERATION AND DECELERATION
FORCES IN SMALL ARMS PROJECTILE
Filed Jan. 15, 1959
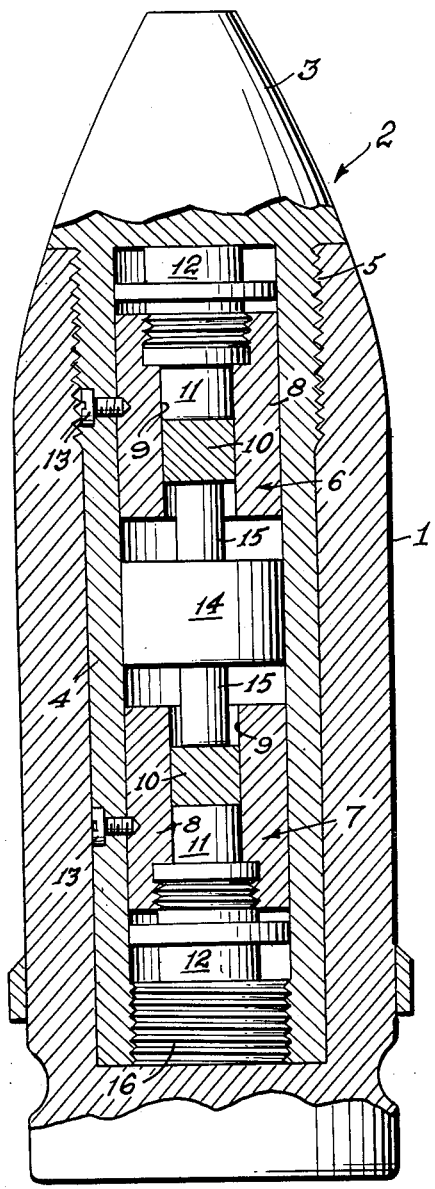
INVENTOR.
Aaron A. Bross
BY
W. E. Thibodeau, A. J. Dupont
& S. J. Rotondi

United States Patent Office 3,024,652
Patented Mar. 13, 1962

---

3,024,652
DEVICE TO MEASURE MAXIMUM ACCELERATION AND DECELERATION FORCES IN SMALL ARMS PROJECTILE
Aaron Arthur Bross, New York, N.Y., assignor to the United States of America as represented by the Secretary of the Army
Filed Jan. 15, 1959, Ser. No. 787,092
1 Claim. (Cl. 73—167)
(Granted under Title 35, U.S. Code (1952), sec. 266)

The invention described herein may be manufactured and used by or for the Government for governmental purposes, without the payment to me of any royalty thereon.

The present invention relates to a device to measure maximum acceleration and deceleration forces in a small arms projectile, and more particularly to a device wherein both set-back and impact forces may be measured accurately by a single instrument and in a single firing operation.

Heretofore, to measure acceleration and deceleration forces, it has been necessary to employ a separate gage for each force measured and this entailed a separate firing of projectiles equipped with such gages thus consuming considerable time and labor on part of the testing personnel.

One method previously employed to test both acceleration and deceleration in a single firing operation was to weight the base of the projectile carrying a single gage. It was then fired vertically to measure the set-back force, and due to its weighted base, the projectile fell back on the ground on its base, thus measuring the impact force. This resulted in deforming the same gage twice but at different points thereon. This resulted in an accurate testing for the acceleration force but not so accurate testing for the impact force. The gage used in this operation was necessarily complex and likely to result in malfunction thereof.

The present invention eliminates this inaccurate impact testing by providing a device that will permit the projectile to be fired directly at the target and a resultant accurate reading for both acceleration and impact forces by employing a pair of axially spaced copper "crusher" gages separated by a sliding block which will deform the rear gage during firing due to setback and then deforming the forward gage upon target impact.

It is therefore a primary object of this invention to provide a device that will measure both acceleration and deceleration forces in a projectile accurately.

It is another object to provide a device for measuring acceleration and deceleration forces in a projectile that is fired directly at a target.

It is further object to provide an acceleration and deceleration forces measuring device that is simple of construction, efficient, inexpensive of manufacture, and readily assembled.

The exact nature of the invention as well as other objects and advantages thereof will clearly appear from a description of a preferred embodiment as shown in the single FIGURE of the accompanying drawing in which there is illustrated in longitudinal section the device of the invention attached to a projectile casing.

Referring to the drawing by characters of reference, 1 indicates a shell casing in which the exploding charge and the fuze elements have been removed therefrom.

2 indicates generally the device of the invention and comprises a member having solid nose portion 3 simulating the fuze removed from the shell and a hollow tubular portion 4 extending from the nose portion while 5 indicates external threads on portion 4 for threadably mounting the device within the fuze shell 1. Set back and impact measuring elements are arranged in coaxial relation within the tube 4 and consist of forward and rearward identical internal pressure gages generally indicated by 6 and 7 respectively. The gages 6 and 7, illustrated are of the type, Mark I (Navy) and form no part of this invention as any other type may be employed that could be readily adapted for use with the invention. This type gage usually consists of a sleeve 8 provided with a bore 9 in which a cooper crusher gage 10, usually of soft copper or like material is disposed. A hardened steel anvil 11 is disposed at one end of the bore and is retained in its position by a threaded nut 12. As both gages 6 and 7 are identical, the description of one will suffice, like parts in both being identified by like reference characters. Both gages 6 and 7 are disposed in tube 4 in axially spaced relation fore and aft as illustrated and are prevented from axial movement in tube 4 by set screws 13 in the wall of tube 4. Means to deform the crusher gage elements 10, under acceleration and deceleration are provided, and consists of a cylindrical sliding block of hardened steel, generally indicated by 14 which is disposed between gages 6 and 7 in tube 4. Extending in coaxial relation from sliding block 14 are integral shafts 15 also of hardened steel, which bear against crusher elements 10 in bores 9 in the pressure gages 6 and 7 when the device is in assembled relation for use. A threaded plug 16 of hardened steel closes the end of tube 4 and serves to position the operating elements in their position within the tube 4 and to bring shafts 15 of block 14 to bear tightly against the crusher elements 10.

In operation, the projectile is fired from its cartridge case (not shown) at a target. Upon set back force of the projectile, block 14 and shafts 15 will move rearwardly to deform the rearward crusher element 10 and upon target impact of the projectile nose 3 with the target, block 14 and shafts 15 move forward to deform forward crusher element 10. The device is then dismantled and the elements 10 are removed and their deformation is measured.

From the foregoing it is apparent that a novel and reliable device has been devised to measure the acceleration and deceleration rate of a projectile, the uses and advantages of which are well known to ordnance personnel.

While what has been described herein is particularly illustrative of a presently preferred embodiment of the invention, it is not intended that the scope of the invention be limited thereto but that it embrace any modifications and changes which fall within the true spirit of the invention, as covered by the appended claim occurring to those skilled in the art.

What is claimed is:

In a device for measuring the maximum acceleration and deceleration forces of a projectile, a tubular housing having a integral solid nose portion and an open, internally threaded rearward end, said housing secured within the well of a projectile, an externally threaded plug closing said open end of said housing, a deformable gage fixed forwardly and rearwardly in coaxial relation in said tubular housing and a cylindrical block having a pair of coaxial shafts arranged, one on each side thereof, integral with and extending forwardly and rearwardly of said block, said shafts having a diameter less than the diameter of said block, said block and said shafts being slidably mounted axially in said tubular housing between said gages whereby said rearward shaft deforms said rearward gage in response to acceleration force of said projectile and said forward shaft deforming said forward gage in response to deceleration force of said projectile.

References Cited in the file of this patent

UNITED STATES PATENTS

| | | |
|---|---|---|
| 2,362,484 | Hickman | Nov. 14, 1944 |
| 2,445,307 | Mindlin | July 13, 1948 |
| 2,523,474 | Mason | Sept. 26, 1950 |
| 2,620,652 | Hartmann | Dec. 9, 1952 |

FOREIGN PATENTS

| | | |
|---|---|---|
| 1,145,559 | France | May 6, 1957 |